March 10, 1964  G. W. MORGAN  3,124,266
CASING FOR PORTABLE ELECTRICAL APPARATUS
Filed Feb. 16, 1962  2 Sheets-Sheet 1
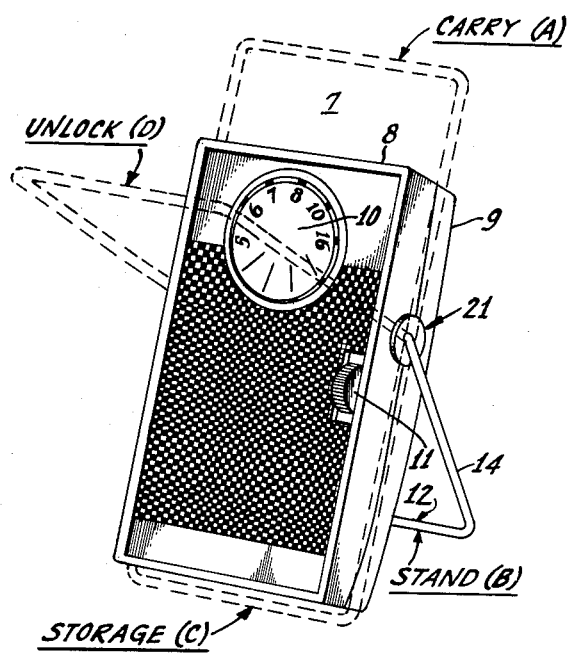
Fig. 1.
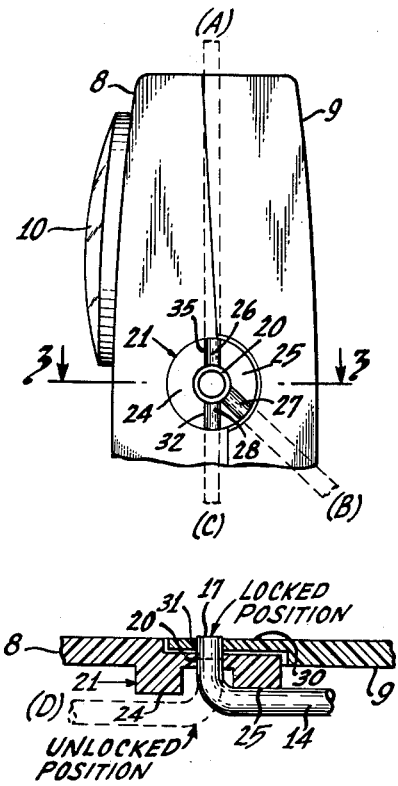
Fig. 2.
Fig. 3.
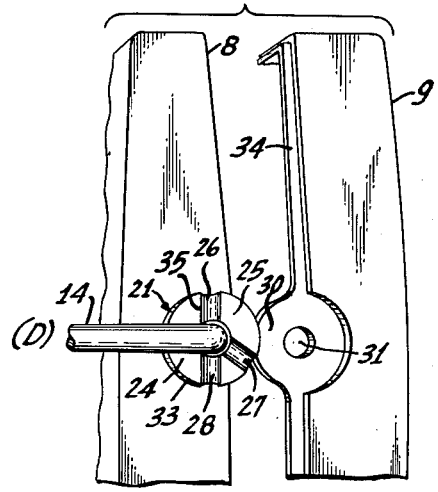
Fig. 4.
INVENTOR.
GARY W. MORGAN
BY Eugene M. Whitacre
ATTORNEY.

United States Patent Office 3,124,266
Patented Mar. 10, 1964

3,124,266
CASING FOR PORTABLE ELECTRICAL
APPARATUS
Gary Wayne Morgan, Indianapolis, Ind., assignor to Radio Corporation of America, a corporation of Delaware
Filed Feb. 16, 1962, Ser. No. 173,696
4 Claims. (Cl. 220—4)

The present invention relates to portable electrical apparatus, and more particularly to thin-walled plastic and like separable or divided casing or container shells for portable electrical apparatus, such as test and measuring instruments, transistor radio receivers and the like. Casings of this type generally comprise two complementary parts such as an open front, top or bottom part, which may be the casing proper, and respectively a fitted back, bottom or top part as a cover or closure means therefor. The enclosed apparatus is most often wholly mounted in and carried by the casing proper.

In use, the casing parts must be securely locked or fastened together to provide a unitary casing structure and protection for the apparatus therein. However, it is desirable that the casing parts likewise be readily unlocked and separable to provide for inspection and maintenance of the apparatus, such as replacing batteries in transistor radio apparatus. Generally, casing for apparatus of this latter type are provided with removable screws or like means for locking or securing a detachable back or like casing part to a complementary front part or casing proper.

Apparatus of this type, for which the present invention is particularly adapted, is preferably provided with carrying means such as a handle attached to the casing. This may be a unitary wire bail element from which the receiver casing depends when carried, with the ends of the bail element or handle pivotally engaging the sides of the casing. In many radio receiver applications the handle may be moved or rotated from the carrying position into a position to hold or prop the casing upright on a table, shelf or the like.

It is an object of this invention to provide an improved casing for portable electrical apparatus with casing-handle lock and unlock means for two complementary separable casing elements, such as front and back cover elements.

It is also an object of this invention to provide an improved two-part separable casing for portable electrical instruments, transistor radio receivers and like cased electrical apparatus, which may be securely locked in use and readily unlocked and opened for interior inspection by operation of a carrying handle therefor.

It is a further object of this invention to provide an improved instrument casing of the type described, having a positionable bail handle which may hold the casing upright or suspended, and which also may effect locking and unlocking of the separable casing parts, such as front and back parts. In a radio receiver casing this eliminates the need for separate fastening means such as screws, bolts and the like.

It is also a further object of this invention to provide an improved instrument casing having two separable complementary parts and a pivotally mounted bail-type carrying handle, wherein the handle is movable from a carrying position sequentially to different angular positions, in the final one of which it effects unlocking of the casing parts for opening and inspection, and to which final position it is prevented from being moved directly from the carrying position.

In accordance with an embodiment of the invention, two separable complementary casing parts are locked together and unlocked by means actuated by and including a bail-type carrying handle which rotates on a fixed pivot axis into each one of several detent-defined or controlled stop positions. Locking pin means, cam-actuated in response to rotation of the handle from a carrying position through one or more of said stop positions to an unlock position, provide for locking said parts together except in said unlock position. Stop means are provided for the handle which allow the casing to be carried and to swing without accidentally unlocking the parts, such as the back or cover means, for example, from a radio receiver casing. Thus, the handle cannot be rotated directly from the carrying position to the unlock position, but must be moved sequentially through the detent-defined stop positions.

The invention will further be understood from the following description of a present embodiment thereof, and with reference to the accompanying drawings, and its scope is pointed out in the appended claims.

In the drawings, FIGURE 1 is a view, in perspective, of a radio receiver having a casing embodying the invention;

FIGURE 2 is an enlarged or elevational view of a portion of the receiver casing of FIGURE 1, showing further details of construction in accordance with the invention;

FIGURE 3 is a cross-sectional view of a portion of the casing taken on the section line 3—3 of FIGURE 2, and on a further enlarged scale;

FIGURE 4 is a fragmentary side view, in perspective, of the portion of the casing as shown in FIGURE 2, with the parts thereof separated to show details of locking means therefor in accordance with the invention; and, FIGURE 5 is a rear view of a part of the casing, as shown in FIGURES 2 and 4, showing further details of the locking means in accordance with the invention.

Figure 5:
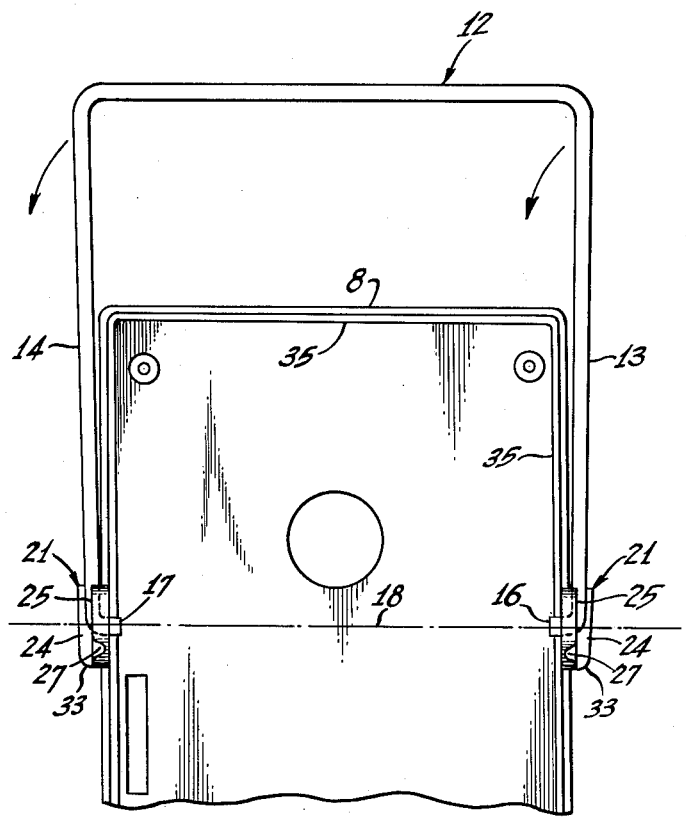

Referring to the drawings, wherein like reference numerals refer to like parts throughout the various figures, a radio receiver casing 7 includes a front part or casing proper 8 and a complementary back part or cover 9. These are joined, as shown more particularly in FIGURE 1, to provide a unitary closed casing for the internal radio apparatus of which the tuning dial 10 and an operating knob 11 are shown.

The casing is provided with a bail-type carrying handle 12 having flexible spring arms 13 and 14 which are connected at their ends with the casing, as shown more clearly in FIGURES 1 and 5 for example. The handle 12, which may be considered to include the arms 13 and 14, is preferably, as shown, in the form of a wire bail of relatively large gauge wire and having the ends of the arms in-turned to provide retractable locking and pivot pins 16 and 17 on opposite sides of the casing and on a common axis indicated by the dot and dash line 18 in FIGURE 5. The pins 16 and 17 are thus integral with the bail handle and arms in the present example, although they may be otherwise provided in connection with any suitable form of rotatable handle for resiliently pressing the locking pins into pivotal engagement with the casing sides as indicated.

The bail or handle thus rotates on a fixed pivot axis which is transverse through the casing, into any one of several detent-located or controlled positions as indicated fully in FIGURE 1 and partially in FIGURE 2. In the present example these positions are a normal carrying or Carry position (A), a Stand or easel support position (B), a Storage or folded position (C) and an Unlocked position (D). The handle is prevented from moving directly from the Carry or (A) position to the Unlocked or (D) position. It must move sequentially through intermediate positions, such as the Stand and Storage positions, before reaching the Unlocked position. Suitable detent, stop or positioning means are provided for the handle, as will hereinafter be described, which allow the casing, that is, the radio receiver, to be carried and swung without danger of accidentally unlocking the back or cover means by rotation of the handle on its pivot mount directly from the Carry position (A) to the Unlocked position (D). There is only one Unlocked position of the handle, in which the casing parts may be separated. This is the Unlocked position (D).

The locking and unlocking operation is effected by axial movement of the locking pins 16 and 17 in response to rotation of the handle about the pivot axis 18 in the manner indicated in FIGURE 1 and as above described. The pivot pins thus also function as retractable locking pins and lie on the same axis in the rotation as the bail or handle. The pins are biased or pressed inwardly toward each other by the resilient spring pressure exerted by the arms of the bail. The latter are made to be sprung together slightly so that the pivot or locking pins snap securely in place on the casing.

The locking or pivot pins face inwardly toward each other to engage aligned pivot and locking holes or openings 20 on the axis 18, of which one is indicated in FIGURE 2, being in the front part of casing proper 8 in the present example, and located centrally of circular projecting detent bosses 21 on opposite sides of the casing as shown more clearly in FIGURE 5.

The circular bosses on the casing may be integral therewith, as in the present example where the casing is of the thin-walled plastic type, and provide both detent and cam means for the handle. The detent means serves to provide fixed positions for the handle as in FIGURE 1 for example, and the cam means provides for moving the handle arms to withdraw the locking pins when the handle is moved to the unlocked position. Thus, in the present example, and as a preferred embodiment of the invention, a detent boss including cam means is formed or provided on each side of the casing surrounding the pivot and locking pin holes, as indicated more clearly in FIGURES 2, 3 and 4. Each detent boss has a high or raised "Unlock" level 24 and a low "Locking" or operating level 25 in which detent notches 26, 27 and 28 are formed, on each side of the casing at proper places, in angular relation to hold or retain the bail or handle in the various positions of Carry, Stand and Storage as shown.

The casing back or cover part 9 has two perforated locking tabs 30, of which one is shown in FIGURE 4, aligned with the detent bosses 21 within the casing and having aligned openings or holes 31 for receiving the locking pins when the handle is off the high level or cam element of the detent boss, that is, in all positions of the handle except the unlocked position. The pivot or locking pins then engage the locking tabs 30 on the back or rear cover 9 through the holes 31, which are aligned with the locking holes 20 in the casing proper or front part when the casing is assembled and closed, as in FIGURES 1 and 2, and the handle is moved from the unlocked (D) position to any one or the other preset positions (A), (B), or (C), as above described.

It will be seen that the rotatable handle may be moved to move the arms from the carrying detent notches 26 across the low level boss surfaces 25 and sequentially through the easel stand notches 27 and the storage notches 28 to the raised cam surfaces or high levels 24, each arm moving upward and outward thereon over a short ramp section 33 as indicated in FIGURES 2, 4 and 5. The arms thus move from the detent notches 28 outwardly onto the cam surfaces 24 and unlock the back or cover means by withdrawing or retracting the locking pin means 16 and 17 from engagement with the openings 31 in the locking tabs 30 of the cover or back part. In other words, as the handle is rotated from the last low-level detent position, the locking pins are moved outwardly from the locking tabs 30 to unlock the back or cover as the arms move or ride farther out on the raised or cam portions of the detent bosses. The cover or back part can then be unsnapped or pulled out from its frictional engagement with the casing proper.

Referring particularly to FIGURES 4 and 5, it will be noted that the back or cover part 9 has a short extended lip or flange 34 around its forward opening for fitting into the front part 8 or the casing proper, which is recessed as indicated at 35 to receive it. The lip or flange 34 thus serves to locate the two casing parts in proper alignment when the two parts are assembled to close the casing. The parts snap or press together with a frictional fit in any of several well known ways. The locking is completed when the handle is moved away from the unlocked (D) position to any of the other detent-controlled positions (A), (B) or (C), in the present example.

The handle is prevented from moving or rotating from the carrying position (A) directly to the unlocked position (D) by a stop element or high shoulder 35 on each detent boss, which is presented to the arms of the handle by the high end of the raised or cam portion 24 adjacent to the detent means or notch 26 on each side of the casing. Thus, the casing may not be accidentally opened by swinging motion from the handle in use because it is locked until the handle is moved sequentially through the successive detent-controlled positions to the unlocked position.

From the foregoing description it will be seen that an improved casing for portable electrical apparatus may be provided with effective carrying and locking means which require no additional elements as are usually provided for such separable or divided cases or container shells. The two separable thin-walled plastic casing parts are joined in complementary assembled relation to provide a unitary structure which may easily be unlocked and opened for inspection as is desirable with such apparatus, such as transistor radio receivers for example.

In accordance with the invention simple means are provided for locking the casing parts through overlapping structural elements, such as the locking tabs and the detent bosses, having locking-pin openings through both parts in aligned relation on opposite sides of the casing structure. Means providing aligned locking pins movable axially through said openings from an inserted locked position holding the parts together to a retracted, unlocked position permitting separation of said parts are included in the structure in any suitable manner and preferably as the in-turned ends of a bail-like carrying handle for the casing which is thus connected at its ends with the locking pins. The bail handle provides a spring action for tightly holding the locking pins in the locked position while at the same time the pins provide a pivot axis for rotational movement of the handle.

When the casing is of plastic material, as it generally is for portable or personal radio receivers and the like, cam means for actuating the end elements of the handle to withdraw the pins in the unlocked position of the handle are readily provided by integral bosses formed on one of the casing parts in transverse alignment about the locking-pin openings on opposite sides of the casing as shown and described. The cam means may then provide a raised shoulder or other suitable element as a stop means for restraining rotation or movement of the handle for a normal carrying position directly to the unlocked position. In addition to this protective feature, this construction in accordance with the invention, of a separable casing with locking and unlocking facilities, is therefore greatly simplified and lowered in cost, while maintenance and service operations, such as battery changes in transistor radio receivers and the like, may be performed with greater ease and speed.

What is claimed is:

1. A casing for portable radio receivers and the like, comprising in combination, separable complementary front casing and back-cover parts providing a unitary casing structure, means providing locking-pin openings through both parts in aligned relation on opposite sides of the casing structure, means providing a pair of aligned locking pins movable axially through said openings from an inserted locked position holding the parts together to a retracted unlocked position permitting separation of said parts, a wire bail carrying handle for said casing having flexible arms connected to and integral wtih said locking pins for resiliently holding said pins in the locked position, said pins providing a pivot axis of movement for said handle, a circular detent boss carried by the front casing part and surrounding each of said openings, detent means on said bosses defining fixed angular stop positions for said handle including a carrying position and intermediate positions sequentially and preceding an unlocking position, cam means on each of said detent bosses for actuating said arms to axially retract the pins to said unlocked position in response to movement of said handle to said unlocking position, and stop means on each of said detent bosses for restraining movement of said handle from the carrying position directly to said unlocking position.

2. A casing for radio receiving apparatus and the like, comprising in combination, two separable complementary front and back-cover parts jointly providing a unitary casing structure, a pair of axially retractable locking pins extending through one casing part into the other on opposite sides thereof and aligned on a common axis, a bail-type carrying handle connected with said pins for pivotal movement thereon and for retracting said pins to unlock said parts in one position, a pair of external circular detent bosses surrounding said pins one on each side of and carried by the front part of the casing, said bosses each having detent notches for engaging the carrying handle in intermediate positions other than said unlocking position and including a carrying position thereof, said bosses each having a cam element for actuating said handle to axially retract said pins and unlock said parts in response to movement of said handle to said unlocked position sequentially through said intermediate positions from the carrying position, and means integral with said detent bosses for restraining movement of said handle directly from the carrying to the unlocked position.

3. A casing for portable radio receiving apparatus and the like, comprising in combination, separable complementary front casing and back cover elements joined to provide a unitary casing structure, a bail handle having two elongated flexible arms and being rotatable in connection with the casing element on a fixed transverse pivot axis into each one of a plurality of defined stop positions, two cam-operated retractable locking pins on opposite sides of the casing element carried by the bail handle at the ends of said arms and lying in said pivot axis effectively as pivot means for said handle, said pins being biased inwardly of the casing element by resilient spring pressure of said arms to snap into and engage aligned pivot holes on opposite sides of said element on said pivot axis, a circular external detent boss on each side of and integral with said casing element surrounding said pivot and locking-pin holes, means on said bosses defining a lower operating level along the path of movement of each arm having detent notches therefor in predetermined angular relation to define said stop positions of the bail handle, locking tabs carried by the cover element having locking holes aligned with said pivot holes to receive said locking pins and thereby lock said casing elements together, cam means on said bosses providing a higher operating level along the path of movement of each arm at an unlocked position sequentially following said stop positions of the bail handle, whereby movement of the arms from said lower to said higher level axially retracts the locking pins from the locking tab holes to unlock the back cover element, and means providing an integral shoulder element on said cam means for restraining said handle from movement directly to said unlocked position from an initial carrying position.

4. A portable casing comprising in combination, two separable casing parts joined in complementary assembly relation to provide a unitary portable structure, said casing parts having overlapping portions on opposite sides of the casing structure with aligned locking-pin openings through both of said overlapping portions, means providing a pair of aligned locking pins movable axially through said openings from an inserted locked position holding the parts together to a retracted unlocked position permitting separation of said parts, a bail-like carrying handle for said casing having flexible arms connected with said locking pins for resiliently holding said pins in the inserted locked positions, said pins providing a pivot axis of movement for said handle, cam means on one of said casing parts for spreading the arms of the handle when said handle is rotated to an unlocking position to axially withdraw the pins from the openings in said overlying portions of the other of said casing parts to permit the casing parts to be separated, and stop means for restraining movement of said handle from a normal carrying position directly to said predetermined unlocked position.

References Cited in the file of this patent

UNITED STATES PATENTS

| | | |
|---|---|---|
| 1,026,093 | Johnson | May 14, 1912 |
| 2,879,916 | Hoffmann | Mar. 31, 1959 |
| 2,947,434 | Aberer | Aug. 2, 1960 |